(12) United States Patent
Lee et al.

(10) Patent No.: US 7,671,926 B2
(45) Date of Patent: Mar. 2, 2010

(54) RADIO FREQUENCY MODULATOR

(75) Inventors: Jong Jin Lee, Kyungki-do (KR); Chang Kap Nam, Kyungki-do (KR); Ryo Young Mang, Kyungki-do (KR)

(73) Assignee: Samsung Electro-Mechanics Co., Ltd., Suwon, Kyungki-do (KR)

( * ) Notice: Subject to any disclaimer, the term of this patent is extended or adjusted under 35 U.S.C. 154(b) by 1414 days.

(21) Appl. No.: 11/012,330

(22) Filed: Dec. 16, 2004

(65) Prior Publication Data
US 2006/0053474 A1 Mar. 9, 2006

(30) Foreign Application Priority Data
Sep. 3, 2004 (KR) ...................... 10-2004-0070294

(51) Int. Cl.
*H04N 7/16* (2006.01)
*H04N 5/38* (2006.01)

(52) U.S. Cl. ........................... 348/642; 725/49; 725/68; 725/151; 348/723; 348/724; 348/484; 348/486

(58) Field of Classification Search .................. 725/47, 725/48, 49, 57, 68, 85, 100, 110, 116, 131, 725/139, 146, 151; 348/723, 724, 725, E9.035, 348/E11.011, 642, 484, 486
See application file for complete search history.

(56) References Cited

U.S. PATENT DOCUMENTS 4,747,159 A 5/1988 Kato
5,122,873 A * 6/1992 Golin .................... 375/240.23
6,118,879 A * 9/2000 Hanna ........................ 348/738
6,288,747 B1 * 9/2001 Avalos et al. ............... 348/485
6,539,120 B1 * 3/2003 Sita et al. ............... 348/E5.108
7,079,194 B2 * 7/2006 Lee et al. .................... 348/724
7,277,860 B2 * 10/2007 Srinivas et al. .............. 704/500
2003/0156228 A1 * 8/2003 Lee et al. .................... 348/724

FOREIGN PATENT DOCUMENTS

KR 10-2003-0069813 8/2003

OTHER PUBLICATIONS

Korean Office Action from Korean Intellectual Property Office.
* cited by examiner

*Primary Examiner*—Brian T Pendleton
*Assistant Examiner*—Jose O Rivera
(74) *Attorney, Agent, or Firm*—Lowe Hauptman Ham & Berner (57) ABSTRACT

Disclosed herein is a Radio Frequency (RF) modulator. The RF modulator includes a Chrominance-to-Luminance (C/L) delay compensation unit for receiving a video signal and compensating for a time delay between the chrominance and luminance signals of the video signal, and a modulation unit for receiving the video signal, which is compensated for by the C/L delay compensation unit, and an audio signal and converting the video and audio signal into a preset frequency-band RE signal. The C/L delay compensation unit and the modulation unit are packaged in a single package.

5 Claims, 7 Drawing Sheets

PRIOR ART

RADIO FREQUENCY MODULATOR

RELATED APPLICATION

The present invention is based on, and claims priority from, Korean Application Number 2004-70294, filed Sep. 3, 2004, the disclosure of which is incorporated by reference herein in its entirety.

BACKGROUND OF THE INVENTION

1. Field of the Invention

The present invention relates generally to a radio frequency modulator that is provided in a set-top box for receiving satellite broadcast signals or in a cable broadcasting receiver and, more particularly, to a radio frequency modulator, which can not only overcome the problem of the degradation of image quality by compensating for a chrominance-to-luminance delay, but also enable different channels to be recorded and watched at the same time and a stereo broadcast to be listened to.

2. Description of the Related Art

Generally, a Radio Frequency (RF) modulator is a device that is provided in a satellite broadcasting receiver (set-top box) or cable broadcasting receiver based on broadcasting methods different from a sky wave broadcasting method. The RF modulator functions to convert received satellite or cable broadcast signals into the channel signals of sky wave broadcasting so that a satellite or cable broadcast can be received by a television.

Figure 1:
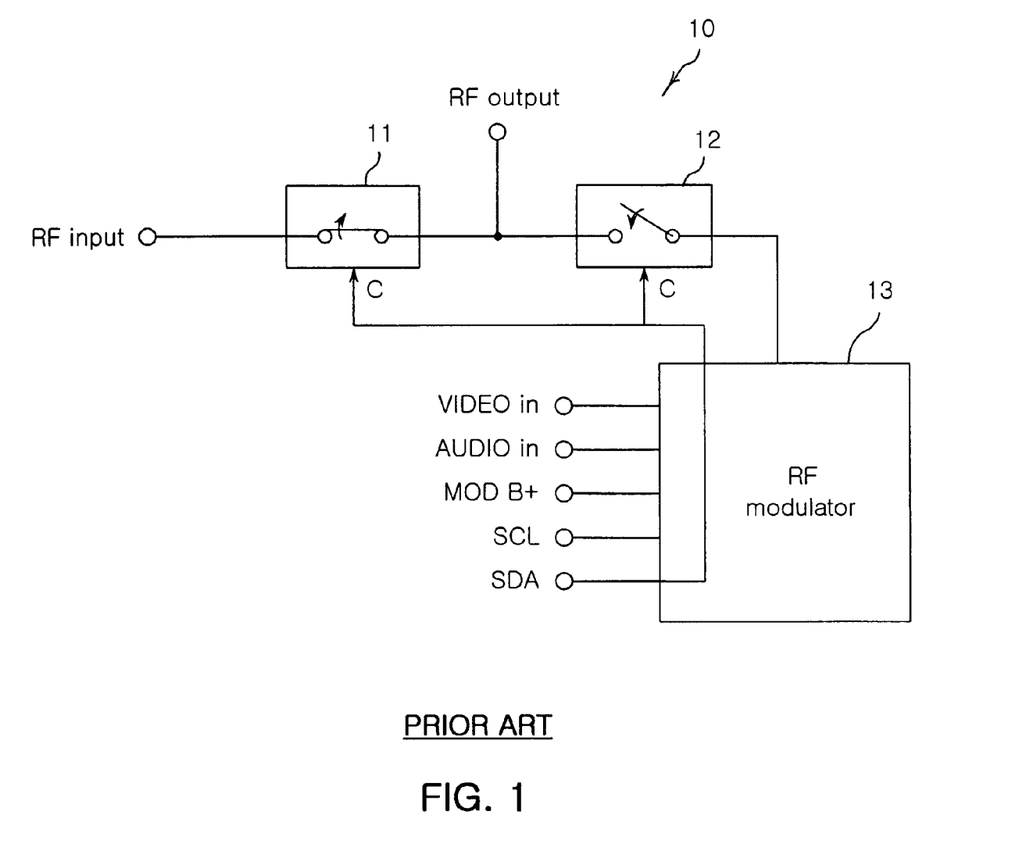
FIG. 1 is a basic block diagram of a typical RF modulator.

FIG. 1 is a conceptual view of a typical RF modulator 13. The RF modulator 13 is implemented using a single independent semiconductor package. The RF modulator 13 functions to receive a video signal (VIDEO in) and an audio signal (AUDIO in) that are received by a corresponding receiver and converted into base-band signals, to add the signals, to receive power (MOD B+) and control signals (SCL and SDA), and to output an RF signal in a preset sky wave broadcasting channel band (e.g., channel 3 or 4 band). The channel band of the RF output signal is set by each individual country. The RF modulator 13 is connected to a first switching means 11 that is placed between an RF input terminal (RF input) and an RF output terminal (RF output) and is switched on/off by the control signal (SDA), and a second switching means 12 that is placed between the output terminal of the RF modulator 13 and the RF output terminal (RF output) and is switched on/off by the control signal (SDA).

In the above-described structure, when the operating power (MOD B+) is on, one of an RF signal either received by an antenna and an RF modulated signal obtained by the RF modulator 13 can be selected and output using the control signal (SDA) In contrast, when the operating power (MOD B+) of the RF modulator 13 is off, the first switching means 11 is turned on, and, therefore, the RF signal received by an antenna is output to the output terminal (RF output).

The RF modulator 13 is implemented using an oscillation circuit, a frequency conversion circuit and a filtering circuit, and modulates the base-band video and audio signals to a preset RF-band carrier. Accordingly, the conventional RF modulator 13 outputs only single, fixed channel-band signals.

Meanwhile, as viewers' desire to watch high-quality images and listen to high-quality sound is increasing, plenty of research into the improvement of image and sound quality is being carried out.

In the meantime, the number of homes having two or more televisions is increasing, in which case different viewers may watch different televisions, so that broadcasts that the viewers desire to watch may be different from each other. Accordingly, there is a tendency that a set-top box for receiving a cable or satellite broadcast is developed to transmit video signals of different channels at the same time.

Therefore, there has been the necessity for an RF modulator capable of supporting the above-described viewers' demands.

SUMMARY OF THE INVENTION

Accordingly, the present invention has been made keeping in mind the above problems occurring in the prior art, and an object of the present invention is to provide an RF modulator that can improve image quality by compensating for a Chrominance-to-Luminance (C/L) delay.

Another object of the present invention is to provide an RF modulator that can not only improve image quality by compensating for a C/L delay, but can also support stereophony.

Another object of the present invention is to provide an RF modulator that can not only improve image quality by compensating for a C/L delay, but also correct the magnitude of a transmission RF signal to conform to a transmission distance.

Another object of the present invention is to provide an RF modulator that can not only improve image quality by compensating for a C/L delay, but also can support the simultaneous recording and watching of a plurality of channels by converting the broadcast signals of the plurality of channels into RF signals at the same time.

In order to accomplish the above object, in accordance with a first aspect of the present invention, there is provided an RF modulator, including a C/L delay compensation unit for compensating for a time delay between the chrominance and luminance signals of a video signal; and a modulation unit for receiving the video signal, which is compensated for by the C/L delay compensation unit, and an audio signal and converting the video and audio signals into a preset frequency-band RF signal; wherein the C/L delay compensation unit and the modulation unit are packaged in a single package.

The RF modulator according to the first aspect may further include a Multi-channel Television Sound (MTS) unit for encoding the right and left audio signals of stereo mode to a single audio signal having a stereo feature, and outputting the single audio signal to the modulation unit.

The RF modulator according to the first aspect may further include an attenuation unit for attenuating the magnitude of the RF signal to a preset level according to the control voltage of the modulation unit.

The RF modulator according to the first aspect may further include an amplifier for amplifying the RF signal that is output from the attenuation unit.

Furthermore, in order to accomplish the above object, in accordance with a second aspect of the present invention, there is provided an RF modulator, including first and second C/L delay compensation units for compensating for time delays between the chrominance and luminance signals of the video signals of first and second different channels, respectively; first and second modulation units for receiving the two video signals, which are output from the first and second C/L delay compensation units, and the audio signals of the first and second different channels, and converting the input video and audio signals into preset different frequency-band RF signals; and a combining unit for combining the different frequency-band RF signals, which are output from the first and second modulation units, into a single signal; wherein the first and second C/L delay compensation units, the first and second modulation units and the combining unit are packaged in a single package.

The RF modulator according to the second aspect may further include first and second MTS units for encoding right and left audio signals of the first channel to a single audio signal and right and left audio signals of the second channels to a single audio signal, respectively, and then outputting the audio signals to the first and second modulation units, respectively.

The RF modulator according to the second aspect may further include an attenuation unit for attenuating the magnitude of an RE signal, which is output from the combining unit, to a preset level according to the control voltage of the first modulation unit.

The RF modulator according to the second aspect may further include an amplifier for amplifying the RF signal that is output from the attenuation unit.

Furthermore, in order to accomplish the above object, in accordance with a second aspect of the present invention, there is provided an RF modulator, including first and second C/L delay compensation units for compensating for time delays between the chrominance and luminance signals of the video signals of first and second different channels, respectively; first and second MTS units for encoding the right and left audio signals of the first channel to a single audio signal and the right and left audio signals of the second channel to a single audio signal, respectively, so as to implement stereo sound; first and second modulation units for receiving the two video signals from the first and second C/L delay compensation units and the two MTS signals from the first and second MTS units, and converting the input video and audio signals into preset different frequency-band RE signals; a combining unit for combining the two RF signals, which are output from the first and second modulation units, into a single RF signal; an attenuation unit for attenuating a level of the RF signal, which is output from the combining unit, according to a control voltage of the first modulation unit; and an amplification unit for amplifying the RF signal that is level-adjusted by the attenuation unit; wherein the first and second C/L delay compensation units, the first and second MTS units, the first and second modulation units, the combining unit, the attenuation unit, and the amplification unit are packaged in a single package.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 2:
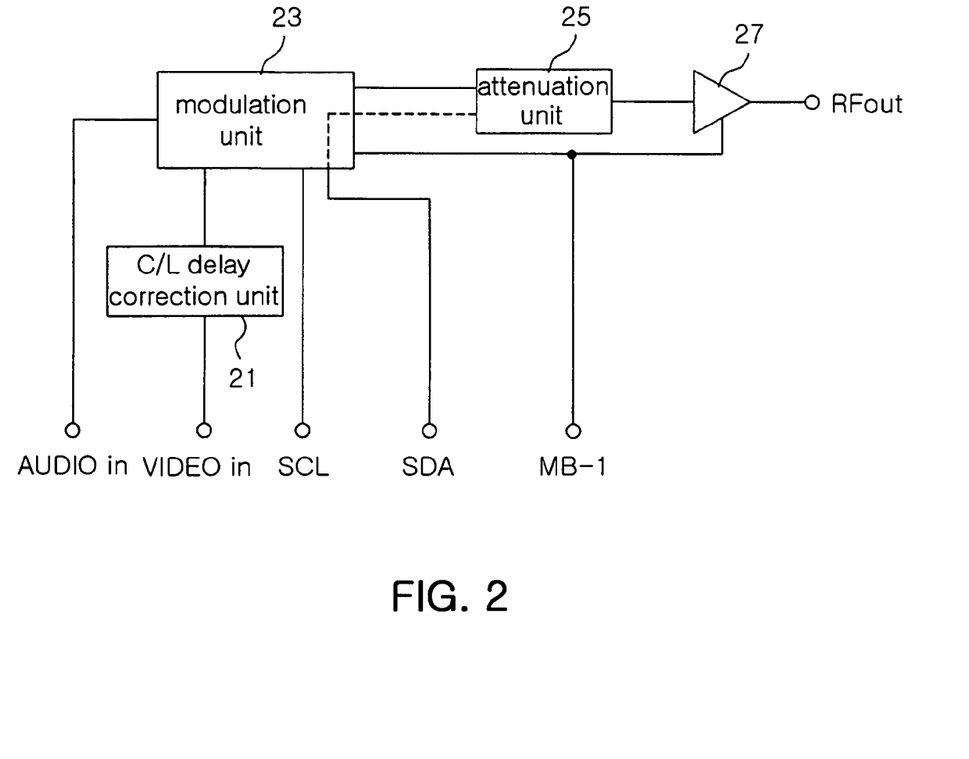
FIG. 2 is a block diagram showing an RF modulator according to a first embodiment of the present invention.

FIG. 2 is a block diagram showing an RF modulator according to a first embodiment of the present invention. The RF modulator of FIG. 2 converts the video and audio signals of a single channel into an RF signal and transmits the RF signal.

Referring to FIG. 2, the RF modulator of the present embodiment basically includes a C/L delay compensation unit 21 for receiving a video signal and compensating for a time delay between the chrominance and luminance signals of the video signal, and a modulation unit 23 for receiving the video signal, which is C/L-compensated for by the C/L delay compensation unit 21, and an audio signal and converting the video signal and the audio signal to a preset frequency-band RF signal. The C/L delay compensation unit 21 and the modulation unit 23 are packaged in a single package.

The RF modulator can overcome the problem of the degradation of image quality by transmitting the video signal after compensating for the time delay between the chrominance and luminance signals of the video signal, and can simplify the construction of a set-top box by implementing a C/L delay compensation function as well as an RF modulation function in a single element.

This RF modulator according to the first embodiment of the present invention may include one or both of an attenuation unit 25 for attenuating the magnitude of the output RE signal to a preset level in response to the control voltage of the modulation unit 23 and an amplification unit 27 for amplifying an input RE signal to a preset level, in accordance with a consumer's request or need.

In the case where the level of an RF signal, which is output from the modulation unit 23, exceeds a signal range that is required by equipment connected to the output terminal of the modulation unit 23, the attenuation unit 25 can adjust the level of the RF signal to the required signal range by lowering the level of the RE signal.

Furthermore, the amplification unit 27 is connected to the modulation unit 23 or attenuation unit 25, and amplifies an input RF signal. The amplification unit 27 is provided to transmit a certain level of signal to a destination in the case where the transmission distance of the RF signal is longer than a reference distance. For example, the amplification unit 27 may be applied to the case where the distance from a set-top box to a television is long.

Figure 3:
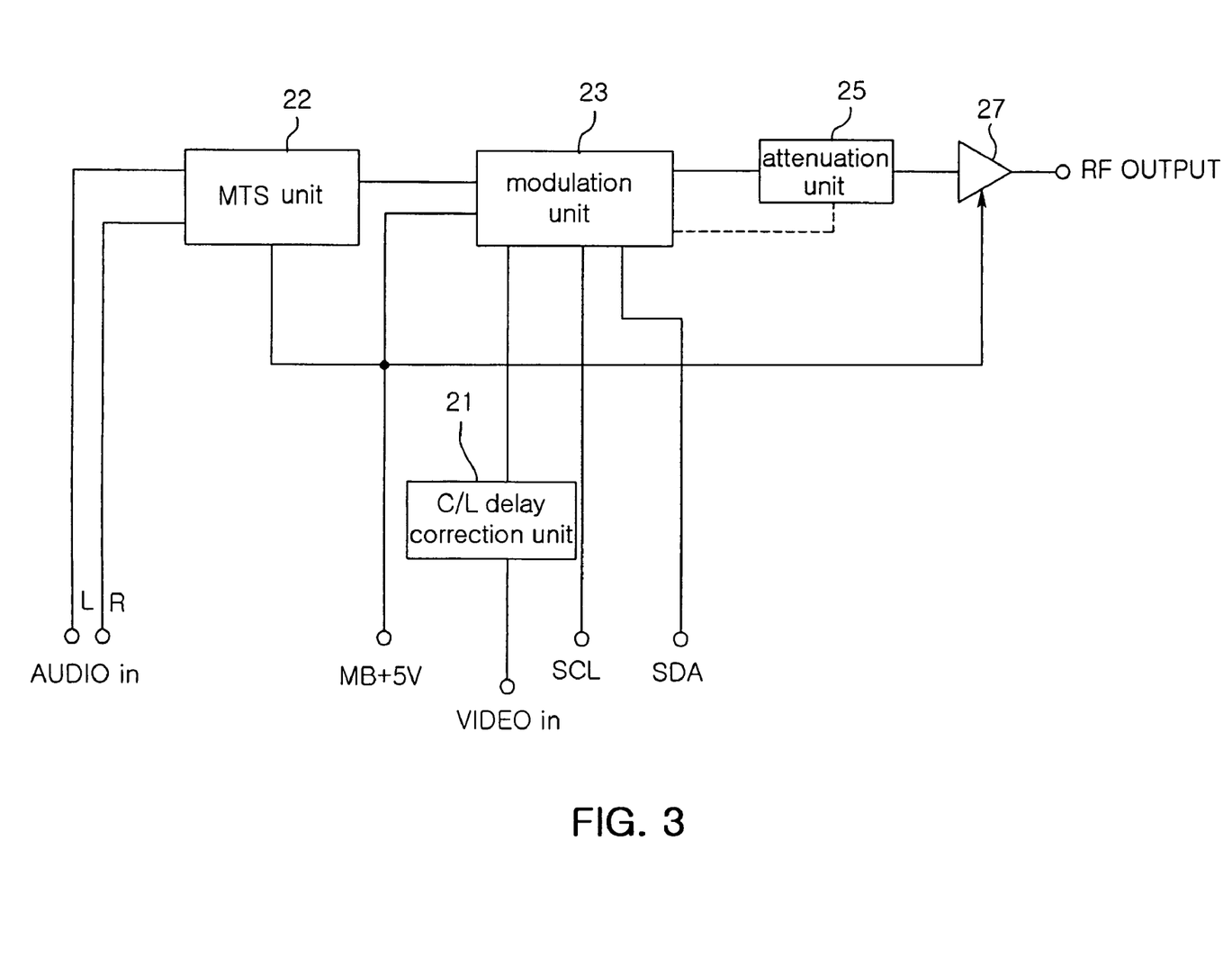
FIG. 3 is a block diagram showing a modification of the RF modulator of FIG. 2.

FIG. 3 is a block diagram showing a modification of the RF modulator according to the first embodiment of the present invention. Referring to FIG. 3, the RF modulator of the present modification further includes a MTS unit 22 for receiving the right and left audio signals of stereo mode, encoding the signals into a single audio signal having a stereo feature and applying the audio signal to the modulation unit 23, in addition to the C/L delay compensation unit 21 and the modulation unit 23, and/or the attenuation unit 25 and the amplification unit 27.

The term "MTS" is an abbreviation of Multi-channel Television Sound, and provides stereo sound at the time of watching a television.

In the case of a stereo audio signal with right and left audio signals separated from each other, the MTS unit 22 encodes right and left stereo audio signals to a single audio signal while maintaining a stereo function, and then applies the encoded MTS signal to the modulation unit 23. With the MTS unit 22, when the RF broadcast signal output from the RF modulator is played back on a television, the playback of stereo sound can be achieved.

One or more of the MTS unit 22, the attenuation unit 25 and the amplifier 26 may be selected and provided according to installation circumstances or the consumer's demands.

Figure 4:
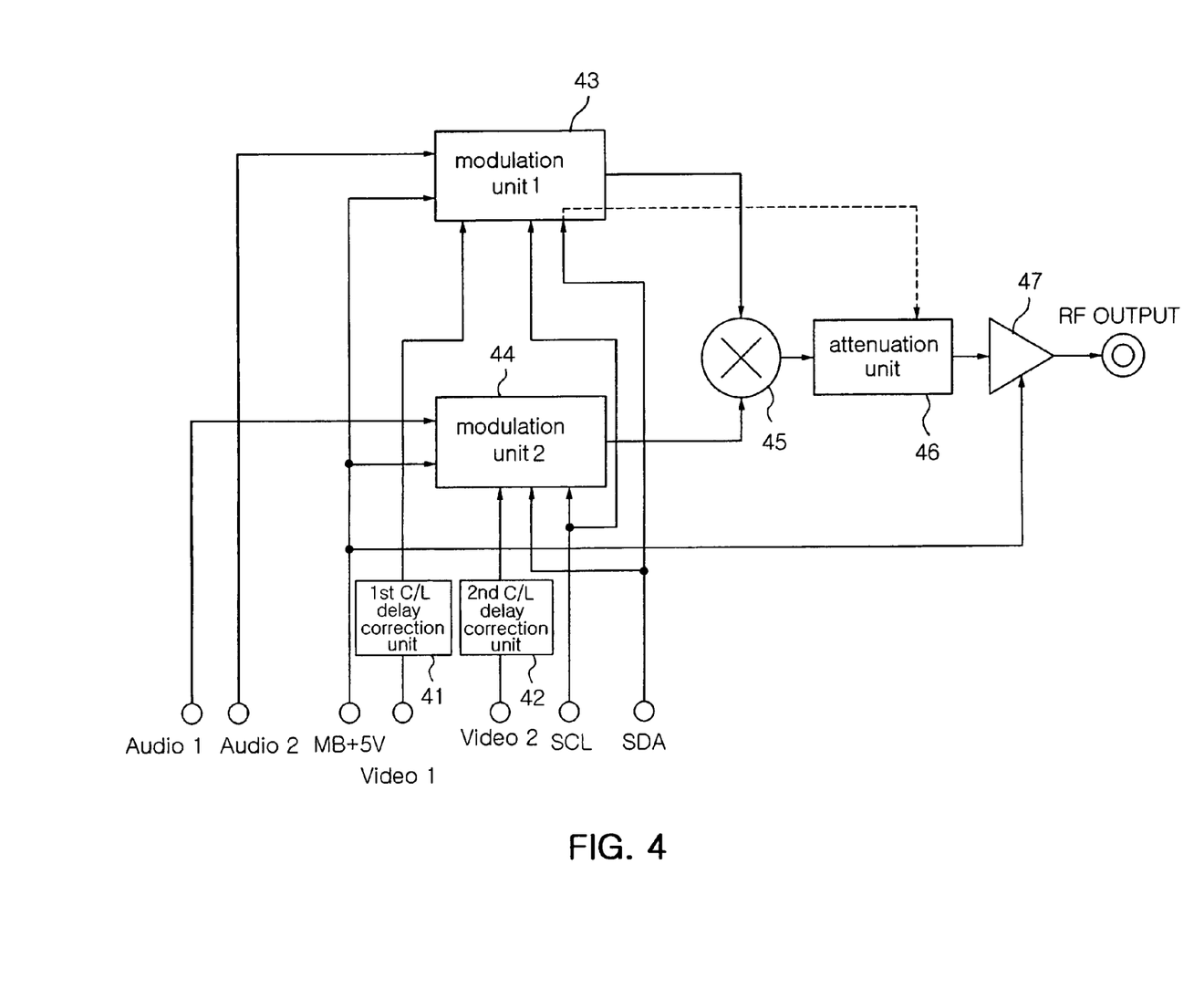
FIG. 4 is a block diagram showing an RF modulator according to a second embodiment of the present invention.

FIG. 4 is a block diagram showing an RF modulator according to a second embodiment of the present invention. The RF modulator of the second embodiment converts and outputs the video and audio signals of different broadcasts at the same time. The RF modulator basically includes first and second C/L delay compensation units 41 and 42 for receiving the video signals of first and second different channels, respectively, and each compensating for a time delay between chrominance and luminance signals, first and second modulation units 43 and 44 for receiving two video signals, which are output from the first and second C/L delay compensation unit 41 and 42, and the audio signals of the first and second channels, and converting the input video and audio signals into preset different frequency-band RF signals, respectively, and a combining unit 45 for combining the two RF signals of different frequency bands, which are output from the first and second modulation units 43 and 44, into a single RF signal.

The RF modulator may further include an attenuation unit 46 and/or an amplification unit 47 according to installation circumstances and the consumer's demands, in addition to the above construction.

As described above, the first and second C/L delay compensation units 41 and 42 receive the two video signals of different channels, respectively, and each compensate for a C/L delay between the chrominance and luminance signals of each video signal, thus preventing the degradation of image quality.

Thereafter, the first and second modulation units 43 and 44 receive video signals, which are output from the first and second C/L delay compensation units 41 and 42, and the audio signals of corresponding channels, and convert the signals into preset RF signals. The RF signals of different frequencies, which are output from the first and second modulation units 43 and 44, are combined together by the combining unit 45, and are output as a single signal.

In the case where the level of an RF signal, which is output from the combining unit 45, exceeds a signal range that is required by equipment connected to the output terminal, the attenuation unit 46, which can be selectively provided, can adjust the level of the RF signal to the required signal range by lowering the level of the RF signal. Furthermore, the amplification unit 47 may be connected to the combining unit 45 or attenuation unit 46, and amplifies an input RF signal. The amplification unit 47 is provided to transmit a certain level of signal to a destination in the case where the transmission distance of the RF signal is longer than a reference distance. For example, The amplification unit 47 can be applied to the case where the distance from a set-top box to a television is long.

Figure 5:
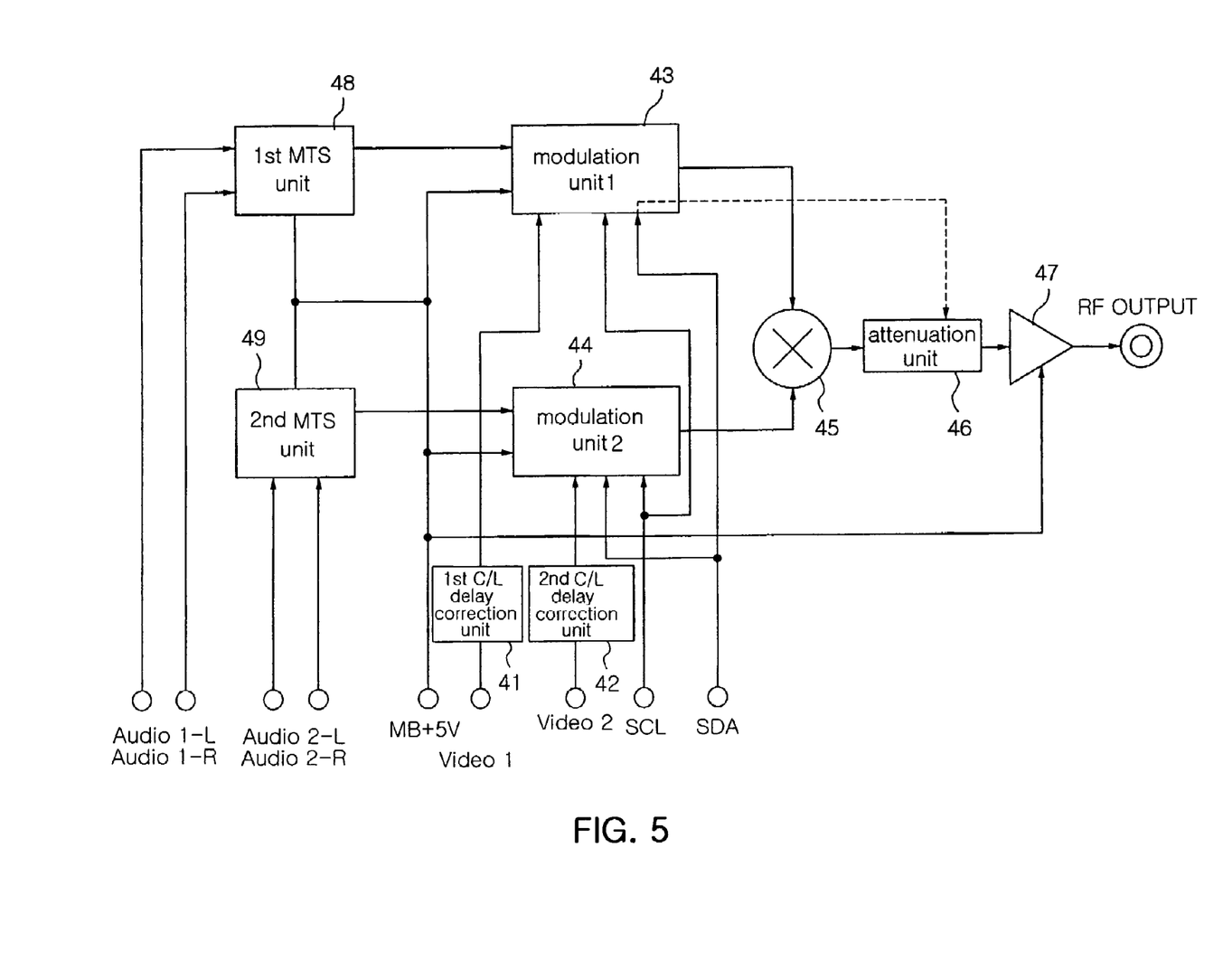
FIG. 5 is a block diagram showing a modification of the RF modulator of FIG. 4.

FIG. 5 is a block diagram showing a modification of the RF modulator according to the second embodiment of the present invention. This RF modulator further includes first and second MTS units 48 and 49, in addition to the construction of FIG. 4.

The first and second MTS units 48 and 49 receive the audio signals of different channels, respectively, encode the audio signals to MTS signals, respectively, and then apply the MTS signals to first and second modulation units 43 and 45, respectively.

In this case, the RF signal, which is output from a corresponding RF modulator, can include stereo sound.

In the same manner as in the first embodiment, one or more of the first and second MTS units 48 and 49, the attenuation unit 46, and the amplification unit 47 may be selectively provided according to installation circumstances and the consumer's demands.

Figure 6A:
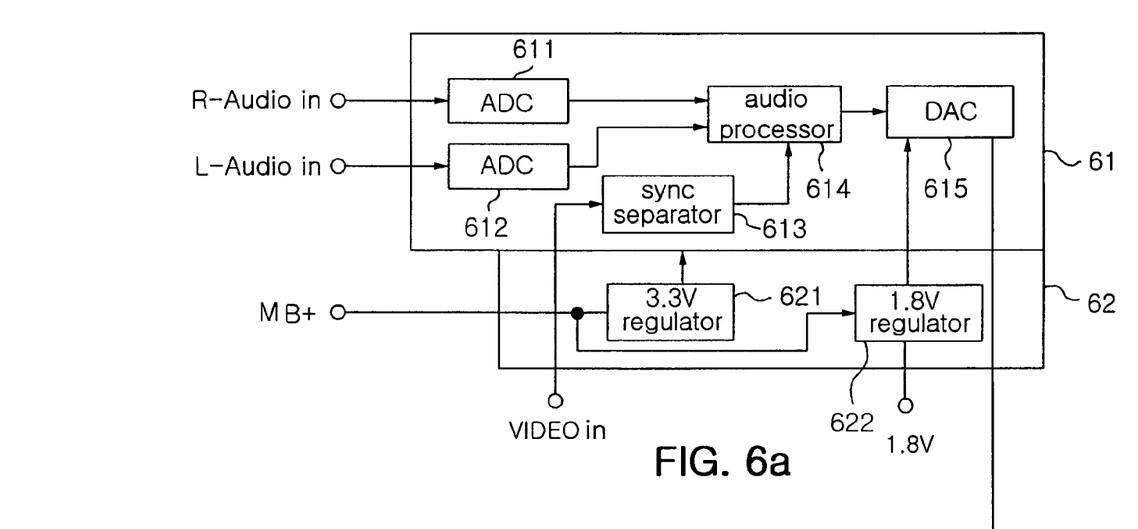
FIG. 6a is a block diagram showing the detailed construction of an MTS unit provided in the RF modulator of the present invention.

The above-described MTS units 22, 48 and 49 may be constructed as shown in FIG. 6a. Referring to FIG. 6a, each of the MTS units 22, 48 and 49 includes first and second Analog-to-Digital Converters (ADCs) 611 and 612 for receiving right and left audio signals (R- and L-Audio in), respectively, and converting the audio signals to digital signals, a sync separator 613 for separating a sync signal from a video signal, an audio processor 614 for simultaneously receiving right and left audio data from the first and second ADCs 611 and 612 and encoding the audio data to an MTS signal, a Digital-to-Analog Converter (DAC) 615 for converting the encoded data, which is output from the audio processor 614, to an analog signal, and regulators 621 and 622 for converting applied power (B+) into operating power (for example, 3.3 V and 1.8 V), which are requested by individual component circuits, and supplying the operating power to the component circuits, respectively.

Each of the MTS units constructed as described above converts right and left audio signals into digital data, encodes the digital data according to a predetermined rule, converts the digital data into an analog signal again, and outputs the analog signal.

Figure 6B:
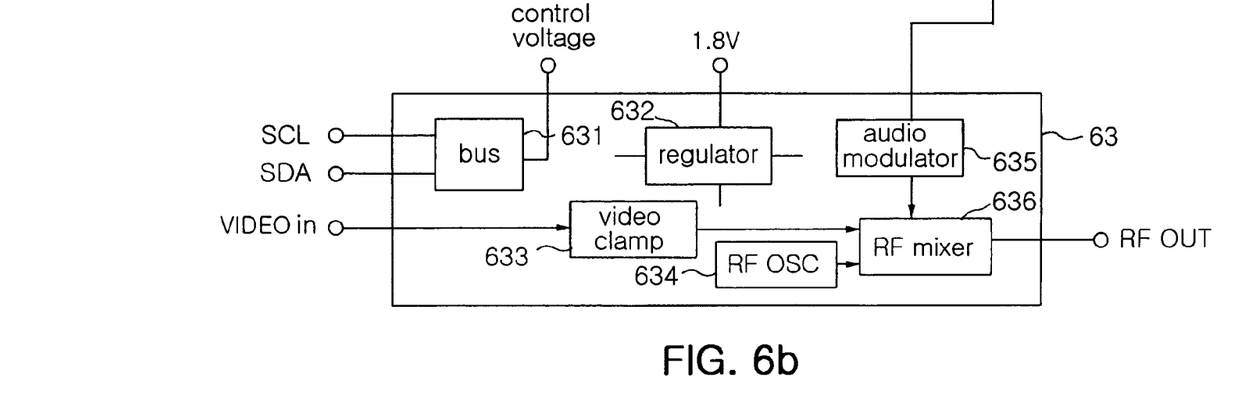
FIG. 6b is a block diagram showing the detailed construction of a modulation unit provided in the RF modulator of the present invention.

Each of the modulation units 23, 43 and 44, which are provided in the above embodiments, can be constructed as shown in FIG. 6b. That is, each of the modulation units 23, 43 and 44 includes a video clamp 633 for clamping a base-band video signal (VIDEO in), which is input from the outside, to a preset level, an RF oscillator 634 for generating a preset frequency signal, an audio modulator 635 for FM modulating an audio signal input from the DAC 615 of the MTS unit 22, 48 or 49, and an RF mixer 636 for mixing the FM modulated audio signal and the video signal, which is output from the video clamp 633, with the RF signal of the RF oscillator 634. At this time, in the case where the RF modulator is not provided with the MTS unit 22, 48 or 49, an audio signal (AUDIO in) input from the outside is input to the audio modulator 635.

Each of the modulation units 23, 43 and 44 further includes a voltage regulator 632 for converting operating power (for example, 1.8 V), which is input from the outside, into a plurality of required DC voltages, and a bus 631 for transmitting or processing control signals (SCL and SDA) applied from the outside.

Figure 7A:
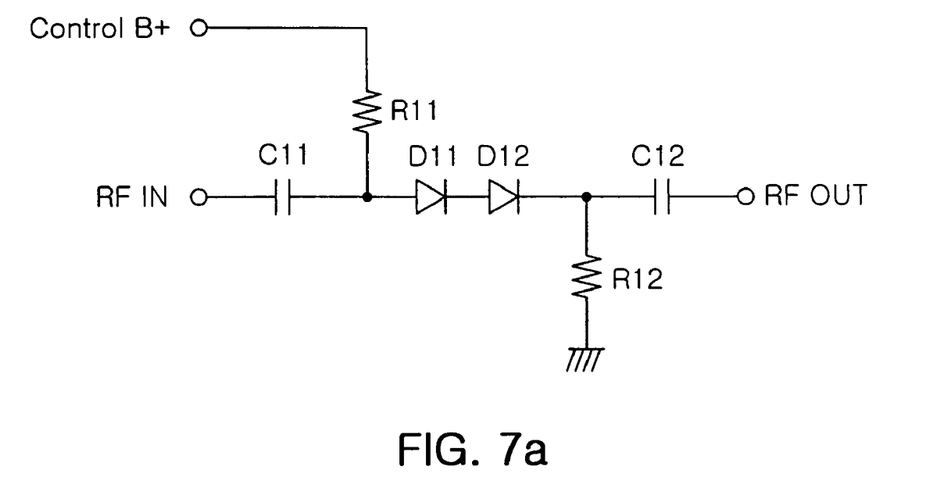
FIGS. 7a and 7b are circuit diagrams showing examples of an attenuation unit provided in the RF modulator of the present invention.
Figure 7B:
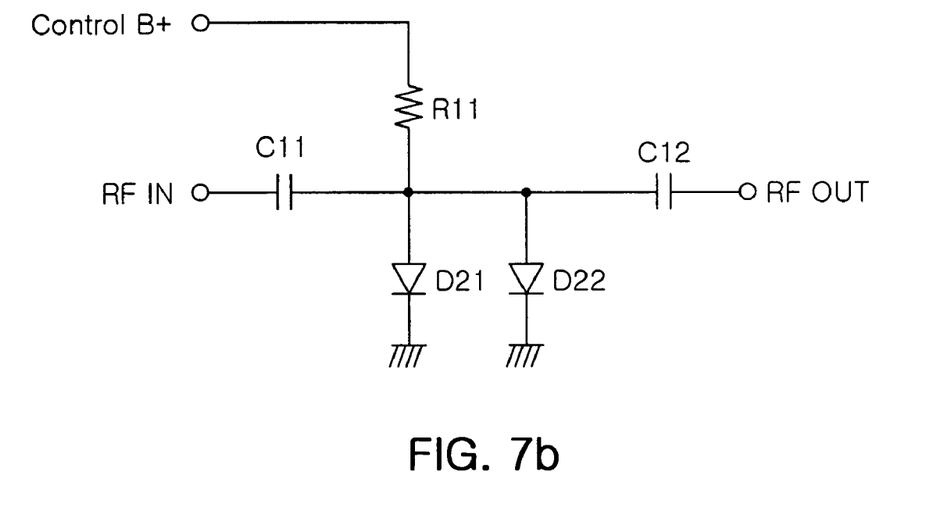

The signals output from the modulation units 23, 43 and 44 are generally high-level signals (for example, 78 dBuV). However, such a high-level signal is not necessary for connection with a television installed nearby. Accordingly, the attenuation units 25 and 46 attenuate such high-level-signals to an appropriate level (for example, 67 dBuV), and may be constructed as shown in FIG. 7a or 7b. In the attenuation circuits of FIGS. 7a and 7b, when pin diodes D11, D12, D21 and D22 are turned on and operate in a forward direction according to a control signal (control B+) applied from the modulation units 23, 43 and 44, an internal resistance value is almost zero and the RF input signal is output without attenuation. In contrast, when the pin diodes D11, D12, D21 and D22 are turned off and operate in a reverse direction, the internal resistance is connected to capacitors C11 and C12 and attenuates the RF input signal.

As described above, the present invention provides an RF modulator that can prevent the degradation of image quality and reduce the number of parts in a set-top box by including a C/L delay compensation function. The present invention can support the simultaneous playback and recording of different broadcasts and the output of stereo sound. As a result, the present invention can provide a greater variety of functions to users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An RF modulator, comprising:
   first and second C/L delay compensation units for compensating for time delays between chrominance and luminance signals of video signals of first and second different channels, respectively;
   first and second modulation units for receiving the two video signals, which are output from the first and second C/L delay compensation units, and audio signals of the first and second different channels, and converting the input video and audio signals into preset different frequency-band RF signals; and
   a combining unit for combining the different frequency-band RE signals, which are output from the first and second modulation units, into a single signal;
   wherein the first and second C/L delay compensation units, the first and second modulation units and the combining unit are packaged in a single package.

2. The RF modulator as set forth in claim 1, further comprising first and second MTS units for encoding right and left audio signals of the first channel to a single audio signal and right and left audio signals of the second channels to a single audio signal, respectively, and then outputting the audio signals to the first and second modulation units, respectively.

3. The RE modulator as set forth in claim 1, further comprising an attenuation unit for attenuating a magnitude of an RF signal, which is output from the combining unit, to a preset level according to a control voltage of the first modulation unit.

4. The RF modulator as set forth in claim 3, further comprising an amplifier for amplifying the RF signal that is output from the attenuation unit.

5. An RF modulator, comprising:
   first and second C/L delay compensation units for compensating for time delays between chrominance and luminance signals of video signals of first and second different channels, respectively;
   first and second MTS units for encoding right and left audio signals of the first channel into a single audio signal and right and left audio signals of the second channel into a single audio signal, respectively, so as to implement stereo sound;
   first and second modulation units for receiving the two video signals from the first and second C/L delay compensation units and the two MTS signals from the first and second MTS units, and converting the input video and audio signals into preset different frequency-band RF signals;
   a combining unit for combining the two RF signals, which are output from the first and second modulation units, into a single RF signal;
   an attenuation unit for attenuating a level of the RF signal, which is output from the combining unit, according to a control voltage of the first modulation unit; and
   an amplification unit for amplifying the RF signal that is level-adjusted by the attenuation unit;
   wherein the first and second C/L delay compensation units, the first and second MTS units, the first and second modulation units, the combining unit, the attenuation unit, and the amplification unit are packaged in a single package.

* * * * *